United States Patent [19]

Jorgensen

[11] 4,023,297
[45] May 17, 1977

[54] DECOY PRODUCTS FOR GAME BIRDS WITH COMPACT NESTING FACILITIES

[76] Inventor: Dale E. Jorgensen, 1349 N. St. Albans, St. Paul, Minn. 55117

[22] Filed: Oct. 15, 1975

[21] Appl. No.: 622,631

[52] U.S. Cl. ................................................ 43/3
[51] Int. Cl.² ...................................... A01M 31/06
[58] Field of Search .............................. 43/3, 2

[56] References Cited

UNITED STATES PATENTS

| | | | |
|---|---|---|---|
| 156,239 | 10/1874 | Strater, Jr. et al. | 43/3 |
| 639,261 | 12/1899 | Merrill | 43/3 |
| 1,469,613 | 10/1923 | Bailey | 43/3 |
| 1,806,456 | 5/1931 | Haigler | 43/3 |
| 2,564,890 | 8/1951 | Fox | 43/3 |
| 2,706,357 | 4/1955 | Nigh et al. | 43/3 |
| 3,029,541 | 4/1962 | Palmer | 43/3 |
| 3,939,591 | 2/1976 | Schwartztrauber | 43/3 |

*Primary Examiner*—Warner H. Camp
*Attorney, Agent, or Firm*—Williamson, Bains, Moore & Hansen

[57] ABSTRACT

Thin shell bodies which in use are detachably interconnected to form full volumetric simulation of the appropriate game birds. The thin shell sections, when disconnected, are positionable for extremely compact nesting of a multiplicity of the shell sections. Forms of the invention have been provided for buoyant floating use on water as well as for field use. All forms include concavo-convex body portions of thin, preferably elastomer or plastic material having cooperating and interlocking neck and head portions, which when disconnected are readily positionable for extremely compact nesting of a great multiplicity of the essential decoy parts.

5 Claims, 11 Drawing Figures

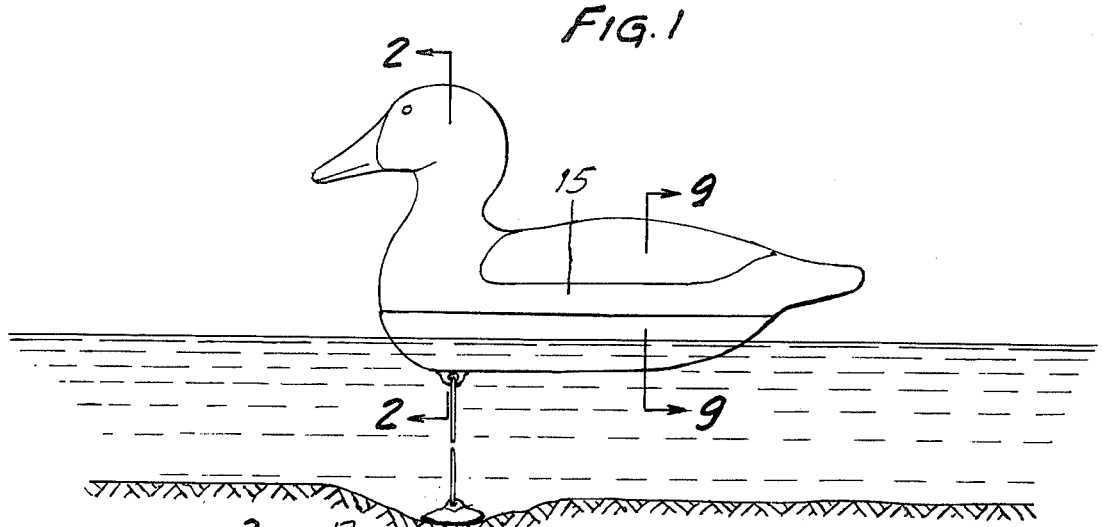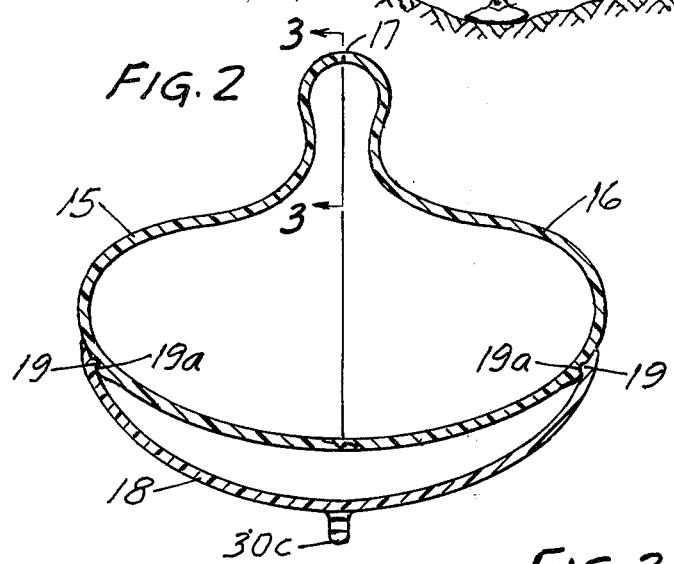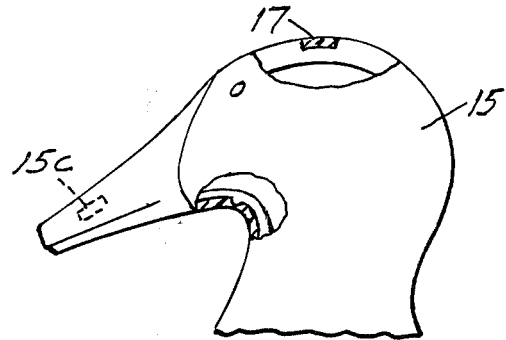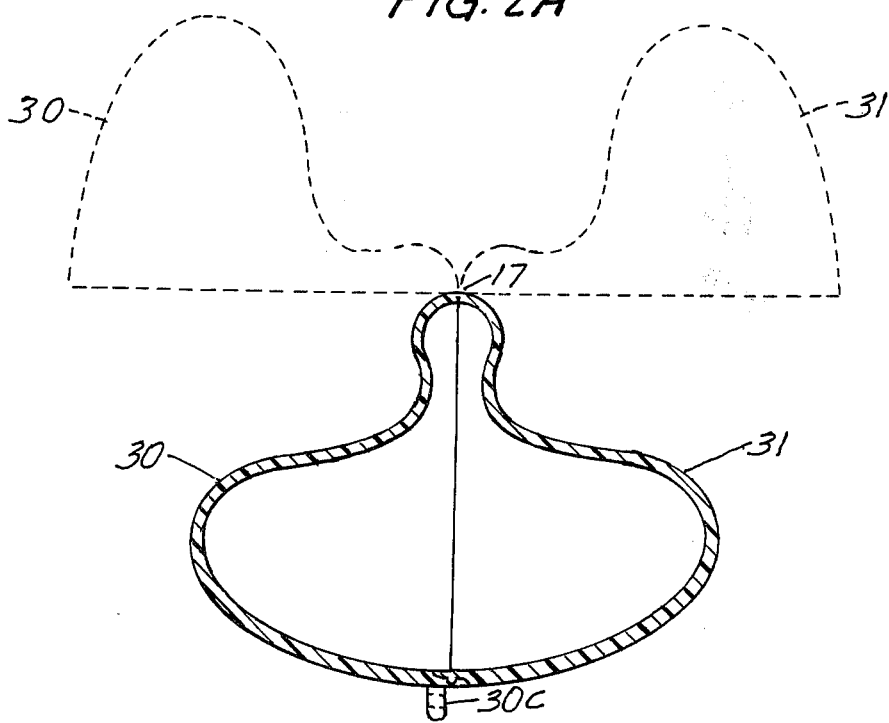

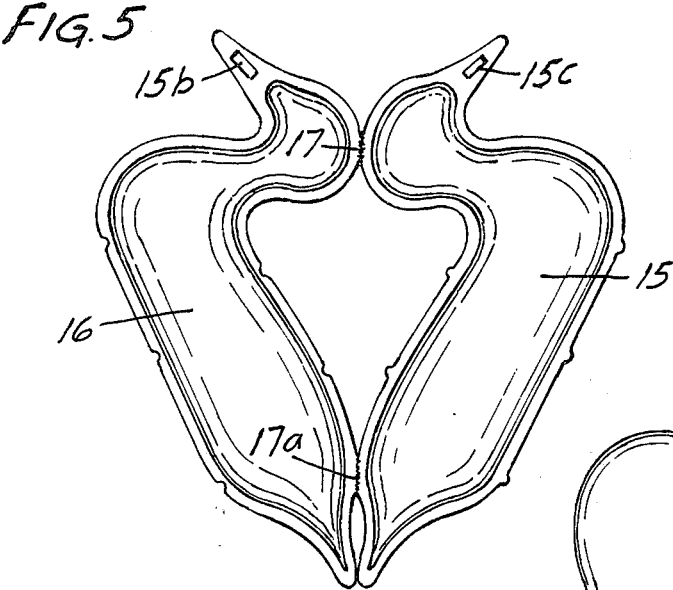
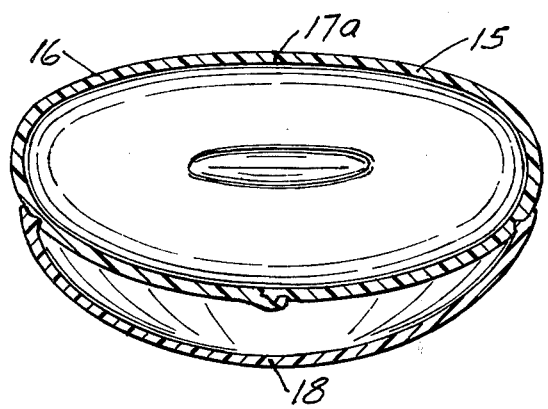
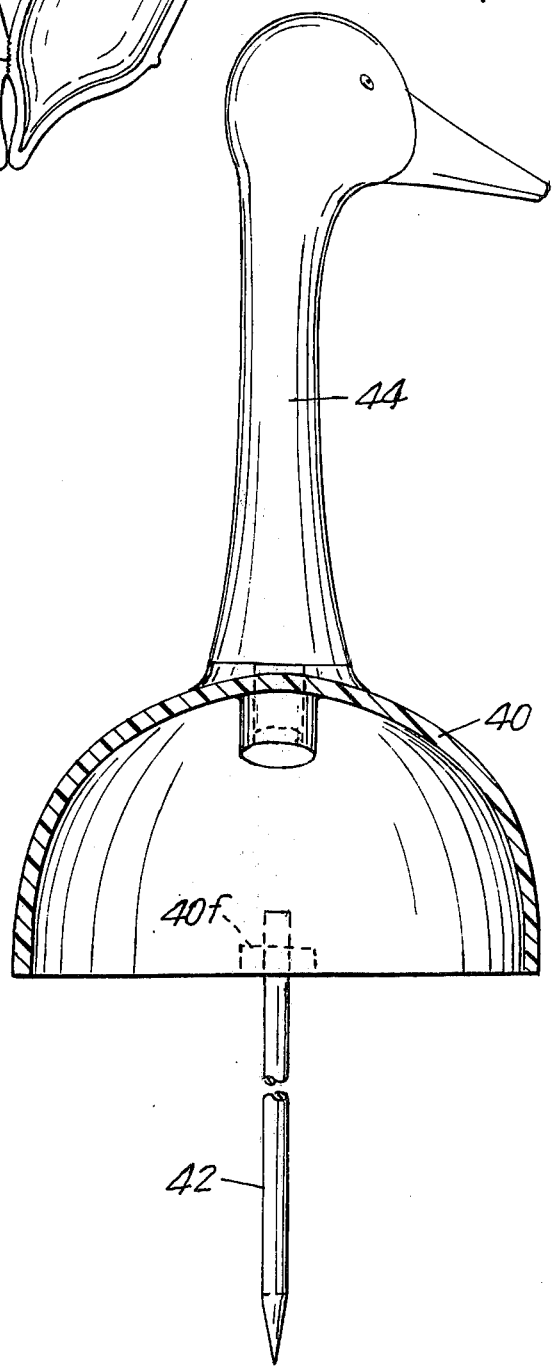

DECOY PRODUCTS FOR GAME BIRDS WITH COMPACT NESTING FACILITIES

BACKGROUND OF THE INVENTION

Beginning more than a century ago with carved or shaped solid float and field decoys usually made from wood and later from water-proofed lighter composition material, game-birds decoys have included inflated or other lighter and hollow decoys, most of which in volumetric form, simulated ducks, geese or other game birds for which the hunting was intended.

All of said prior art game-bird decoys have been very clumsy and ponderous to handle, not only in transportation but also in the operation of setting out the decoys on lakes and other waters and in retrieving the same after hunting. The voluminous space required for storage and sales display of said decoys have been quite objectionable.

Further prior art discloses a number of forms of game-bird decoys which employ for body and head portions, upstanding water-proofed body and head sheet material of planar shape. Some of these have included detachable float bottoms to support the upstanding planar bodies and neck and head portions. The examples of some of the last mentioned prior art are found in the disclosures in the following U.S. patents, to wit:

Timm — U.S. Pat. No. 2,483,680
Ballard — U.S. Pat. No. 2,450,572
Johnson — U.S. Pat. No. 2,435,083
Palmer — U.S. Pat. No. 3,029,541.

SYNOPSIS OF THE INVENTION

In the several forms of my invention rather deep, concavo-convex body sections are employed constructed of very thin but tough and durable elastomer material including a number of plastics as well as natural and synthetic rubber substances. For the floating type game-bird decoys I employ two readily connectable shell body sections having preferably integrally formed neck and head sections also of concavo-convex shell construction, which in use are efficiently connected with substantially registering edges to constitute close likenesses and full volumetric shape of the game-birds simulated.

In the forms of the invention for dry field use the bodies of the decoy per se require only one enlarged deep concavo-convex body shell but they also employ for neck and head portions of the simulated fowl a pair of cooperating shell sections readily connectable for constituting the full volumetric neck and head portions of the simulated game-bird. A cooperating pair of the neck and head sections is readily connectable, in field use, with the larger single shell body section and cooperating means such as stakes or equivalent support media are provided for appropriately supporting the assembled decoy in the desired field positions.

My invention includes, in combination with the said thin shell sections, a receiving and reinforcing member or deck having closely spaced, complemental recesses for precisely receiving a great multiplicity of the decoy shell members in extremely compact, nested relation. This phase of the invention is optional.

For my floating game-bird decoys, I prefer to mold the two cooperating body and head shells integrally in a single molding operation. A number of relatively inexpensive plastic and elastomer materials are available, which readily facilitate thin, shell moldings and where the two cooperating shell members may be interconnected along at least portions of the back edges and head portions to provide hinge action. A number of tough plastic materials will provide the flexibility and bending and durability desired. Thus with such hinge action the two shell sections may be swung to opposed complementary relation with the then free lower edges of the simulated decoy body disposed substantially in opposed registration. Cooperating intermittently spaced attachment elements such as groove and tenon portions or detachable "buttons" may be provided or attached on the opposed lower registering edges of the shells, whereby when interconnected, a full volumetric decoy body is produced with provision for floatation and which in all visible parts, very closely simulates in overall appearance, the game-bird for which it is intended.

DETAILED DESCRIPTION OF EMBODIMENTS

The following description made in connection with the accompanying drawings, will more clearly disclose the structure, functions and operation of my invention as well as the new and improved results obtained therefrom.

In said drawings:

FIG. 1 is a side elevation (on a small scale) showing an assembled form of my decoy floated on a body of water and anchored for use;

FIG. 2 is a vertical section (on a larger scale) taken substantially along the line 2—2 of FIG. 1;

FIG. 3 is a vertical section taken along the line 3—3 of FIG. 2 showing one manner of interconnection and hinge action between the two cooperating head and bill portions of the decoy;

FIG. 2A is a vertical section corresponding to FIG. 2 showing a second and somewhat simplified form of my floating, game-bird decoy, with dotted lines indicating the swung-open positions of the shell sections to provide for compact nesting thereof with other similar decoy units;

FIG. 5 (on the third sheet of drawings) is a top plan view of the two integrally formed shell sections of the invention forms of both FIG. 2 and FIG. 2A swung apart in side-by-side relation for compact nesting with a multiplicity of other similar decoy units;

FIG. 9 is a vertical section taken on the line 9—9 in FIG. 1, showing a second integral fold-hinge connection between the upper rear edge portions of the two main shell members,; and FIG. 10 is a vertical section taken on the line 10—10 of FIG. 7, and on a larger scale, showing one means of conveniently mounting the goose decoy of FIG. 7 for field use.

Figure 4:
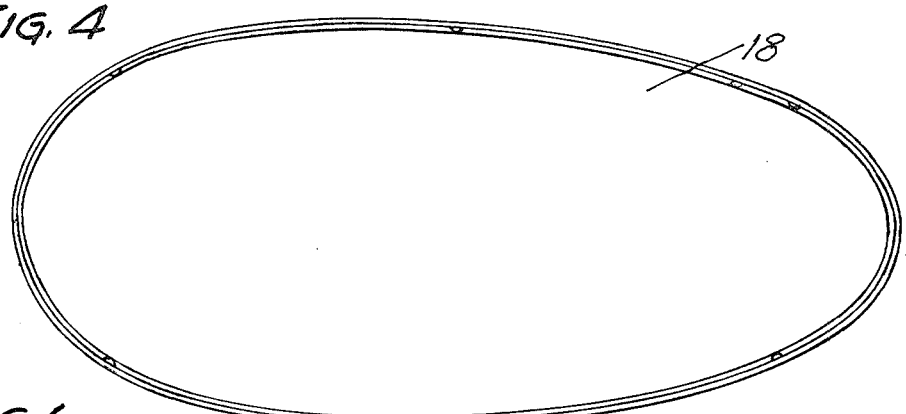
FIG. 4 is a top plan view of the additional bottom ("boat") shell element employed in the invention form illustrated in FIG. 2.

Referring now to the form of the invention showing in FIGS. 1, 2, 3, 4 and 6 of the patent drawings, I provide a pair of cooperating, complementary shell sections 15 and 16 respectively. These shell sections when interconnected in opposed, registering relation are contoured and shaped to form, as illustrated, the entire body and head and bill portions of a full volumetric bouyant decoy very closely simulating from all visible portions above the waterline the game-fowl intended. The two shell sections 15 and 16 are rather deep in concavo-convex structure, to in combination provide a relatively wide body of the simulated game-bird, to prevent tipping over of the assembled decoy when floated on water. Shell sections 15 and 16 are molded or otherwise formed from suitable, tough plastic or elastomer material preferably having a specific gravity approximating 1. Such plastic materials such as polyurethane, flexible P V C, polypropylene, or cycolac are suitable, but numerous other plastics may be utilized. Elastomer materials such as natural rubbers or synthetic rubber having the proper specific gravity may also be equally well employed. The moldings of the shell members are preferably quite thin, not exceeding one eighth inch in thickness and preferably having moderate flexibility and elasticity.

The shell members 15 and 16 are preferably integrally molded as shown in FIGS. 2, 3, 5 and 9 whereby flexible hinge fold portions 17 and 17a disposed as shown in the floating embodiment of my decoy interconnect sections 15 and 16 and are disposed and interconnect the head portions of the decoys as well as rear back body portions thereof.

It will be understood that the two shell sections 15 and 16 may be integrally formed and hinge-connected at their lower edges 15a and 16a with the remaining edges of the two cooperating body shells free for detachable interconnection. It will likewise be understood that the two shell sections may be independently molded or otherwise formed for suitable interconnection along all of their peripheral edges.

In the form of FIG. 2, the lower registering edges of the two shell sections, as well as the upward extending, forward breast portions of the decoy, and rear back and tail portions of the two sections are detachably interconnected by suitable fastening elements preferably spaced along the configuration such as overlapping "button" and recess elements 16b and 15b respectively. The bill elements of the two head portions of the shell elements are detachably interconnected by suitable efficient means such as tongue and groove elements 16c and 15c, as shown in FIGS. 2 and 3.

It will be understood that in both forms of my floating decoys the free edges (unhinged by integral construction) at suitable intervals are provided by readily detachable coupling or inter-connecting elements employed in minimal spaced relation along the registering free edges of the two shell members.

In the form of my decoy product shown in FIGS. 2 and 4 of the drawings, an additional, relatively large but shallow, boat-like bottom shell 18 is employed to give greater bouyancy to the overall decoy and to enable plastic or elastomer materials having a higher specific gravity than 1 to be utilized. The peripheral edge-shape of the bottom concavo-convex shell 18 is fashioned to conform and overlie radial, horizontal line portions of the body shell members 15 and 16 when the latter are assembled, as clearly shown in FIG. 2. "Button" and socket-like or other suitable fastening elements are provided indicated at 19 and 19a in FIG. 2 to interconnect the bottom shell 18 with the overlaid medial body line portions of the two shell sections.

The lowermost central and forward portion of the boat shell 18 has integrally formed therewith a small, depending ear 18b transversely apertured to receive the loop of a knotted, flexible anchor cord 20 which in conventional manner, has a small anchor weight 21 secured to the lower end thereof.

Figure 6:
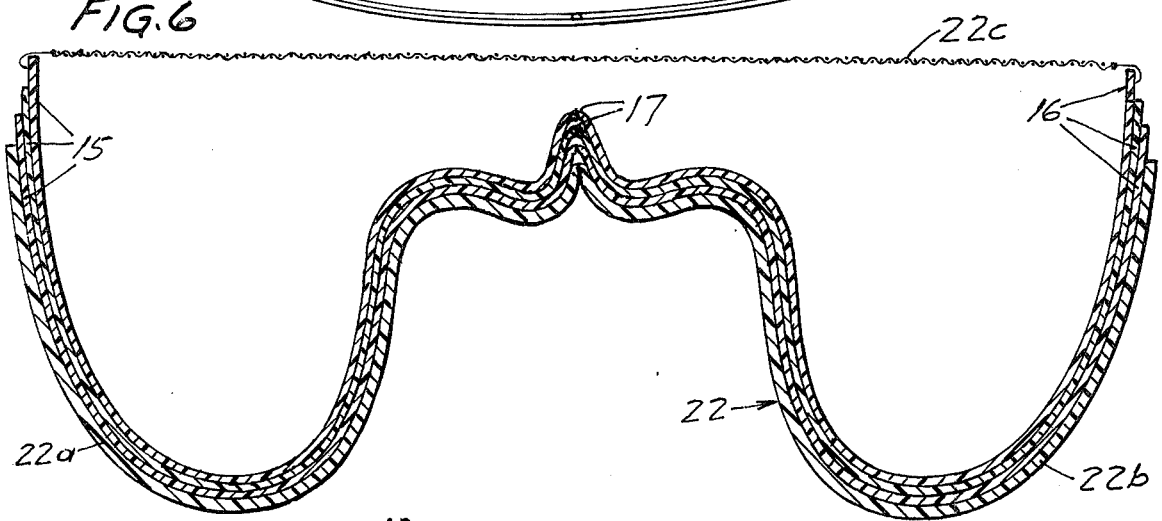
FIG. 6 is a vertical cross section showing an important phase of my invention which combines with a multiplicity of the two body shells of the decoy units a relatively stiff, tray-like container having cooperating pockets for compactly positioning and nesting a multiplicity of swung-out decoy units.

The body shells 15 and 16, when suitably swung apart along the interconnecting integral hinge portions 17 and 17a as shown in FIGS. 5 and 6, are disposed in side-by-side relation with the peripheral edges of the two shells lying substantially in a common plane. Since the two shells are continuously concavo-convex in contour throughout their dimensions they will readily receive and very compactly nest a multiplicity of similar decoy shell sections as shown in FIG. 6. Likewise (not shown) the bottom boat shell sections 18 being continuously concavo-convex in shape, will readily receive and very compactly nest a multiplicity of similar boat sections 18 of identical decoy products.

To properly receive, retain and reinforce a multiplicity of the essential body shell sections 15, 16, and 18 with the peripheral edges thereof disposed, when swung apart, substantially in a common plane, as shown in FIG. 6, I provide a substantially stiff, reinforcing, pocketed deck unit identified as an entirety by the numeral 22, preferably integrally constructed and molded from a relatively stiff, thicker plastic material having the pockets 22a and 22b precisely contoured in concavo-convex form for receiving the swung-apart sections 15 and 16 of the double shell body which as previously recited, includes a tail, head and bill sections of the shell decoy units. Similarly, the reinforcing pocketed deck (not shown) will be provided with a concavo-convex pocket for precisely receiving the lower boatlike shells 18 of the form of the invention shown in FIG. 2 and in such reception the peripheral edges of the lower boat shell 18 will be disposed in substantially a common plane with the peripheral edges of the body shell sections 15 and 16. The close functional relationship of the pocketed positioning deck 22 with a multiplicity of the nested decoy shells is an additional important phase of my invention. As shown, I provide a flexible cover 22c connectible with the two side edges of deck 22 for retaining the shells after the deck is loaded.

Referring now to the somewhat simplified form of my floating decoy structure as shown in FIGS. 1, 2A, 3, 5, 6 and 9 of the drawings, a pair of thin, tough body shell sections 30 and 31 are provided. These concavo-convex shell sections are generally similar to the body shells 15 and 16 of the form first described and include integrally formed head, bill and tail portions for each shell. FIGS. 1, 3, 5, and 6 of the drawings illustrate in common both the first and second embodiments of the invention although reference numerals are applied to said Figs. which pertain specifically to the first embodiment. The two body shells 30 and 31 as shown, are integrally formed in the same molding process and have integral fold-hinge connections 30a between the upper head portions of the shells and secondary, integral fold-hinge connections 31a between the rear back shell portions. The body proper of the second form of the duck decoy is somewhat greater in height than the body defined by the shell sections 15 and 16 of the first form.

As in the first form shown, readily connectible "button and socket" coupling means or tongue and groove elements are provided in the disconnected portions of the registering edges of the two shells 30 and 31 and in this second form preferably the bottom peripheral registering edges of the decoy body may be provided with overlapping portions 30b and 31b respectively, which in turn if desired may have widely spaced "button and socket" retaining elements included thereon.

One of the shell sections at its bottom edge near the forward portion below the head, is provided with a transversely apertured depending lug 30c which is for the purpose of receiving the upper end of the flexible anchor cord 20. The outwardly swung position of the two shells 30 and 31 for nesting is indicated in dotted lines in FIG. 2A and is precisely that as shown in FIGS. 5 and 6 with respect to the invention embodiment first described. The second simplified embodiment does not require or include a bottom, boat-like member such as the bottom shell 18 of the first embodiment.

As in the form first described, a stiff, reinforcing and nest-positioning, pocketed deck such as the deck 22 shown in FIG. 6 is employed, whereby a great multiplicity of the entire swung-apart decoys of the second form may be compactly positioned and nested for storage, transportation, or in cartons displayed for sale.

From the foregoing description, it will be seen that I have conceived and provided several embodiments of very simple, inexpensive and highly efficient construction. Said decoy products will very closely simulate from all visible portions the live game-birds for which hunting is intended.

The advantages and new results obtained from my invention may be briefly summarized as follows:

1. The thin, tough body shell and moldable interconnection construction makes possible manufacturing costs at substantially less levels than any known decoys of the prior art.

2. The construction and concavo-convex body shells with or without the combining, reinforced receiving deck enable an extremely compact nesting of my decoy products for transportation, storage, and sale display. In the setting up of the decoys minimal space is required in the duck boat or other transport medium employed for anchoring the decoys in the body of water.

3. The relatively large volumetric space within the hollow bodies formed, even though the material utilized is somewhat heavier than the specific gravity of water, will assure bouyant flotation.

4. My novel decoys in use, even if inadvertently shot by hunters will not sink as in the case of present inflatable decoys.

Figure 7:
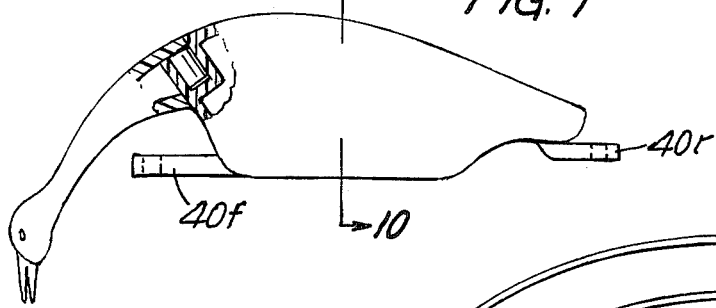
FIG. 7 is a side elevation, on reduced scale, of an assembled goose-simulating decoy for field use.
Figure 8:
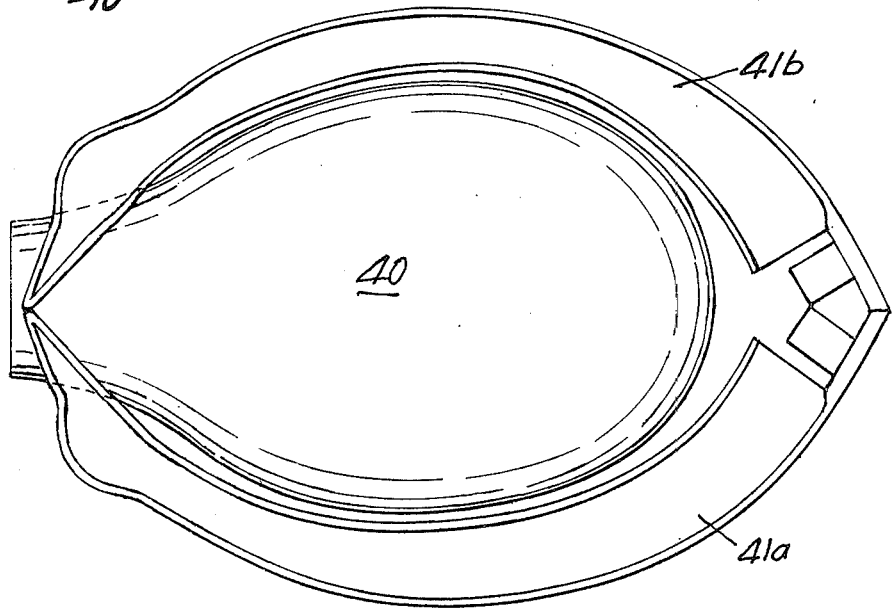
FIG. 8 is a top plan view, on a larger scale, showing the component shell parts of the decoy of FIG. 7 swung out and arranged in compact relation for receiving and nesting a multiplicity of similar goose decoys.

Another embodiment form of my invention for field use as in goose hunting is illustrated in FIGS. 7, 8, and 10 of the drawings. Here a single enlarged concavo-convex shell constructed of thin, tough plastic or elastomer material is employed for the body and tail portions of the simulated fowl, identified as an entirety by the numeral 40. Shell 40 has substantially straight line, lower edges 40a and a forward circularly apertured shell portion 40b forming a downwardly tapered annular socket 40s for detachably receiving neck and head units 41. In FIG. 7 the head and neck unit 41 is made in conformance with the general format of my previously described embodiments and may constitute downwardly curved, integrally molded, complementary elongate shell sections 41a and 41b (see FIG. 8), having terminal fold-hinge interconnecting portion 41c, and having head and bill shell portions 41d and 41e.

As shown in FIG. 8 for extreme compactness in nesting, storage and transportation, the elongate neck shells 41a and 41b may be of such length and dimensions to encircle the body shell 40 (with the exception of the tail portion), thereby economizing substantially in space for storage and transportation.

It will be understood that while the neck assembly 41, as illustrated, is curved downwardly to simulate a feeding posture of the game-bird simulated, upstanding necks and heads may be substituted as shown in FIG. 10, to simulate other positions of the imitated game-bird.

In FIGS. 7 and 10 (dotted lines) one of a number of satisfactory mounting means for supporting the goose decoy in elevated position from the ground is illustrated. Here, integral, heavy, horizontal lugs at the forward and rear lower edges of body shell 40 are provided, indicated at 40f and 40r respectively, suitably apertured for receiving upstanding, substantially vertical stakes 42 which may be driven into the ground for field use.

In FIG. 10 a detachable, upstanding neck and head section as shown comprising complementary shells 43 and 44 is employed in the form shown being constructed from an integral molding hinged along straight line, vertical edges to form a fold-hinge 43h. This integral hinge portion may extend through the underside of the separated head sections 42a and 42b respectively. The upstanding head at its lower when the complementary sections are registered in use as a downwardly, slightly tapered lower attachment end which fits a tapered, tubular portion of the shell 40, as clearly shown in FIG. 10.

From the foregoing description it will be seen that in all forms and embodiments of my invention the new results and advantages will be accomplished. The products and shells are tough in nature, will not shift or break in head, tail and other portions as in the case of the common molded decoys now prevelantly used.

Even in the case of the larger single body shelled goose decoys from a dozen to twenty decoy products may be very compactly nested with the maximum weights of the nested decoys being as little as from 4 to 6 pounds (exclusive of course of the goose decoy stakes).

What is claimed is:

1. A floating, waterfowl decoy constituted substantially throughout of molded, thin plastic sheet material of sufficient rigidity to hold its molded shape but having a degree of flexibility and having a specific gravity approximately 1.00, comprising:

a pair of complemental, concavo-convex shells simulating in external shape the longitudinal contours of the side halfs of the waterfowl imitated;

said shells being connectable in opposed side-by-side relation along longitudinal opposed edges and being disposable in spread out position for nesting similar decoy shells for compact storage and transportation facilities;

the concavity of said shells being relatively deep in cross sectional dimension to prevent toppling of said assembled decoy due to wind in use, and a boat-like member constructed of similar material to such shell sections is provided having an upper edge configuration for lapping relation with the lower overall configurations of such shells when secured together, said lapping relation interconnecting said boat member with said shells, said boat-like member increasing the buoyancy and height of the assembled decoy.

2. The structure and combination set forth in claim 1 wherein a pair of neck and head units are integrally formed with hinge-fold connection along registering edges of said shells, said hinge connections enabling said neck units to be disposed when swung outwardly in side-by-side relation for compact nesting with similar head and nect units of other decoys.

3. The structure set forth in claim 1 wherein said body shells each include concavo-convex, integrally formed, complementary neck and head sections.

4. The structure and combination set forth in claim 1 wherein said pair of complementary body shells are intregrally formed and have hinge connections axially aligned along two longitudinal registering edges of said shells.

5. The structure and combination set forth in claim 1 further characterized by a relatively stiff plate receiving a transporting member comprising a pocketed deck having pockets for precisely receiving and nesting a multiplicity of the body shell members when spread apart or disconnected and means for retaining the multiplicity of said decoy members in said pockets.

* * * * *